THOMAS HUDSPETH,
HAROLD A. ROSEN,
INVENTORS
BY Noel B. Hammond
AGENT

THOMAS HUDSPETH,
HAROLD A. ROSEN,
INVENTORS

BY Noel B. Hammond
AGENT

THOMAS HUDSPETH,
HAROLD A. ROSEN,
INVENTORS

BY Noel B. Hammond

AGENT

THOMAS HUDSPETH,
HAROLD A. ROSEN,
INVENTORS

BY Noel B. Hammond

AGENT

United States Patent Office 3,028,488
Patented Apr. 3, 1962

3,028,488

SATELLITE COMMUNICATION RELAY SYSTEM UTILIZING MODULATION CONVERSION

Thomas Hudspeth, Malibu, and Harold A. Rosen, Santa Monica, Calif., assignors to Hughes Aircraft Company, Culver City, Calif., a corporation of Delaware Filed Feb. 1, 1960, Ser. No. 5,787
3 Claims. (Cl. 250—15)

The present invention relates to systems for relaying radio communications and, more particularly, to a remotely located radio communication relay for receiving an amplitude-modulated carrier wave and retransmitting the modulating information as frequency or phase modulation of a carrier wave.

Communication over long distances, particularly intercontinental communication, is usually accomplished by means of wire lines such as submarine cables or by means of radio communication. Recent trends indicate that the message capacity of the present intercontinental cables will be exceeded in the near future. It has been estimated, for example, that the demand for long distance communication will increase by a factor of eight in the next ten years. The installation of submarine cables is expensive, the first transatlantic telephone cable is reported to have cost about $30,000,000 for 36 voice circuits. Thus, the expansion of long distance communications by the installation of a large number of undersea cables would be very expensive.

Due to the curvature of the earth, long distance radio communication is usually accomplished by means of reflection or refraction of high frequency radio waves from the ionosphere. The width of the frequency band over which ionospheric communication is possible depends to a great extent on the sunspot cycle. Even during the most favorable portions of the sunspot cycle, high frequency radio communication has been unable to support the mounting demand for long distance communication.

Accordingly, it is an object of the present invention to provide a radio communication relay which is simple in form, reliable in operation, small in size, light in weight, and low in power consumption.

Another object of the invention is the provision of a radio communication relay which simultaneously receives and retransmits a plurality of signals with a minimum of intermodulation.

Yet another object of the present invention is to provide a system which relays radio communications with a high signal-to-noise ratio.

In accordance with these and other objects of the invention, a radio relay is remotely located for automatically receiving and retransmitting radio communications. To achieve long distance communication, the radio relay may be located at a substantial distance above the surface of the earth, as in a space vehicle such as a satellite, for example.

The radio relay receives a carrier wave amplitude-modulated by a modulating wave and retransmits the modulating wave as angle modulation of a carrier wave. The angle modulation may be either phase or frequency modulation. By selection of the retransmission frequency for minimum receiver noise and by using a high modulation index, a high signal-to-noise ratio is achieved.

One embodiment of a radio relay in accordance with the invention includes means for recovering the modulating wave from the amplitude modulated signal and phase modulating a locally generated carrier wave with the modulating signal. The modulation index is increased by frequency multiplication of the phase modulated carrier wave. With this arrangement, intermodulation of signals in different channels of the received amplitude modulated signal is negligible during the remodulation process.

A second embodiment of a radio relay in accordance with the invention differs from the first embodiment in that the received amplitude modulated signal is not demodulated but is combined with a large amplitude, locally generated carrier wave to develop a composite wave which is amplitude limited to produce phase modulation. As in the first embodiment, the modulation index is increased by frequency multiplication of the phase modulated carrier wave.

In a third embodiment of a radio relay in accordance with the invention, the received amplitude-modulated signal is again combined with a large amplitude, locally generated carrier wave. In this embodiment however, the amplitude ratio is even larger, 100-to-one for example. The composite signal is limited to produce a phase modulated signal and then a portion of the locally generated carrier wave is canceled from the phase modulated signal. Again, the modulation index is increased by frequency multiplication of the phase modulated signal.

The following specification and the accompanying drawings describe and illustrate exemplifications of the present invention. Consideration of the specification and the drawings will provide a complete understanding of the invention, including the novel features and objects thereof. Like reference characters are used to designate like parts throughout the figures of the drawings.

Figure 1:
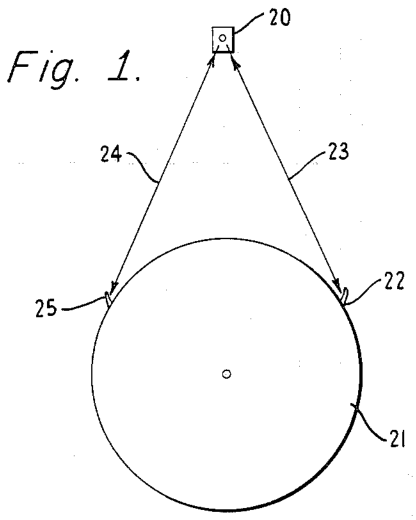
FIG. 1 is a pictorial representation of a communication satellite disposed above the surface of the earth and showing a radio communication path between two widely separated points on the earth by way of the satellite.

Long distance radio communication may be accomplished by retransmitting a radio signal from a remotely located active repeater or radio relay. In FIG. 1 there is illustrated the manner in which intercontinental radio communication may be established by means of a radio relay disposed in a space vehicle such as a satellite 20 which may be in an orbit around the earth 21.

The satellite 20 may be, for example, in a circular, equatorial orbit and may travel with the same angular velocity as the earth 21. The satellite 20 then hovers over a single point on the earth 21. A first ground station 22 transmits and receives radio signals over a line-of-sight path indicated by the arrow 23 between the first ground station 22 and the satellite 20 where the signals are relayed, that is, received and then retransmitted over a line-of-sight path indicated by the arrow 24 between the satellite 20 and a second ground station 25. In this manner, one satellite 20 hovering over a predetermined point on the surface of the earth 21 is able to provide communications between most of the continental United States, all of Europe, and a large part of South America and Africa because a line-of-sight path exists from each of these geographical locations to the satellite 20.

Figure 2:
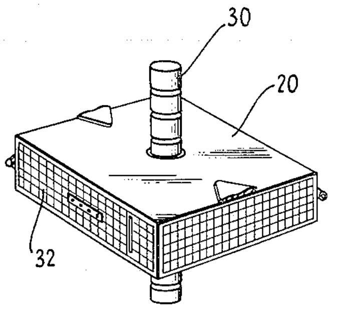
FIG. 2 is a perspective view of the communication satellite of FIG. 1 showing an antenna and solar cells.

The satellite 20 is of a rectangular, box-like configuration, as is illustrated in FIG. 2, and is provided with an antenna element 30 extending from one surface thereof. A plurality of solar cells 32 are disposed on the four surfaces of the satellite 20 that are parallel to the antenna element 30 to convert solar energy into electrical energy for operation of electrical equipment disposed within the satellite 20.

Figure 3:
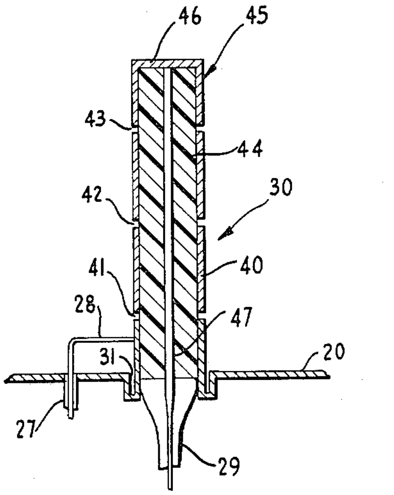
FIG. 3 is a sectional view of the satellite antenna of FIG. 2.

FIG. 3 is a cross-sectonal view of the antenna element 30, which is a slotted radiator of the coaxial type and at the same time a ground plane antenna. A conductive cylinder 40 extends from the surface of the satellite 20 to form an outer conductor of a coaxial transmission line. The lower end of the cylinder 40 is joined to the surface of the satellite 20 at an annular groove 31 which forms a quarter wave choke at a frequency in the vicinity of 500 megacycles per second. Three peripheral slits 41, 42, 43 separate the cylinder 40 into four disconnected sections. The upper and lower sections are approximately ¼ wavelength long at approximately 2400 megacycles per second and the two center sections are each ½ wavelength long. The severed sections of the cylinder 40 are held in place by a loaded dielectric material 44 such as titanium dioxide loaded with iron particles, for example, which reduces the propagation velocity of radio waves inside the antenna element 30. The dielectric material 44 fills the inside of the cylinder 40. The loaded dielectric material 44 causes a wave propagated through the interior of the antenna element 30 to be radiated from each of the slits 41–43 with an in-phase relationship. The upper section 45 of the cylinder 40 is provided with a shorting disc 46 which short circuits the upper end of the upper section 45. A conductive rod 47, which forms an inner conductor, is coaxially disposed inside the cylinder 40 and is embedded in the dielectric material 44. The upper end of the rod 47 is secured to the center of the shorting disc 46 in the upper section 45 of the cylinder 40. The lower end of the rod 47 extends into the satellite 20 and is joined to the center conductor of a coaxial cable 29. The outer conductor being joined to the cylinder 40. The other end of the coaxial cable 29 is connected to radio equipment disposed within the satellite 20, as will be described hereinafter.

The antenna element 30 is excited by propagating a wave along the rod 47, the wave being radiated from the slits 41–43 in the cylinder 40. A conductor 28 extends out of the satellite 20 and is joined to the outer surface of the cylinder 40, the exact junction point being that which provides an impedance match. The other end of the conductor 28 is connected to the center conductor of a second coaxial cable 27, the outer conductor being connected to the surface of the satellite 20. The other end of this cable 27 is also connected to radio equipment disposed within the satellite 20, as will also be hereinafter described.

Figure 4:
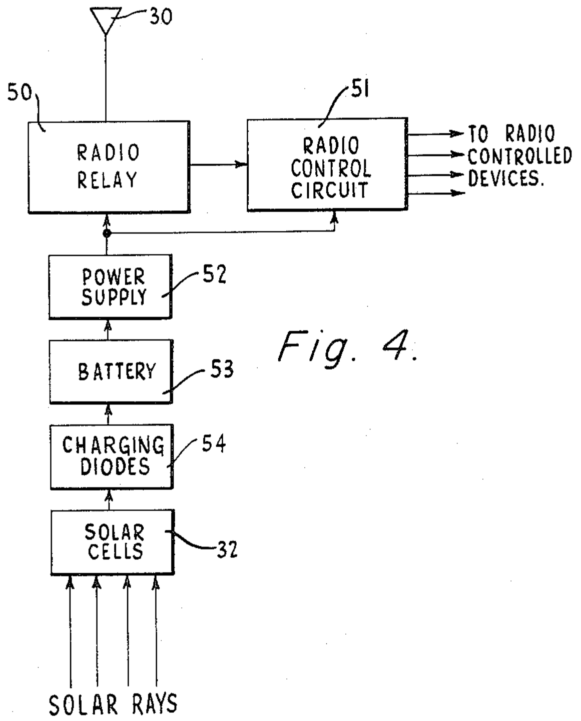
FIG. 4 is a diagram of an electrical system of the communication satellite of FIG. 2.

FIG. 4 is a diagram of the electrical equipment of the satellite 20. A combined radio receiver and transmitter or radio relay 50 is connected to the antenna element 30. The radio relay 50 and the manner of tis connection to the antenna element 30 will be more fully described hereinafter.

A radio control circuit 51 is connected to the radio relay 50 to permit radio control of various electrically operated devices (not shown) in the satellite 20 from the earth 21. The devices to be remotely controlled may be related to establishing the satellite 20 in a predetermined orbit with a predetermined orientation, for example. Remote control circuits are well known and the radio control circuit 51 may be of any conventional type. It may, for example, include a signal demodulator, filters for passing control signals having predetermined frequencies, and associated electromagnetic relays to open and close electrical circuits in response to the control signals.

A power supply 52, which may be of any conventional type, is connected to the radio relay 50 and to the radio control circuit 51 to supply the various voltages and currents necessary for the operation thereof. The power supply 52 is connected to, and obtains its power from, a storage battery 53. The battery 53 is maintained in a charged condition by the solar cells 32 to which it is connected through charging diodes 54.

The solar cells 32 are grouped into four banks, one bank on each of the four surfaces of the satellite 20 that are parallel to the axis of the antenna elements 30 and 31. The cells 32 in each bank are connected in a series-parallel arrangement and, although there may be a different number of cells 32 in each bank, the number of cells in series in each series-parallel arrangement is the same to provide the proper voltage for the battery 53. The charging diodes 54 or rectifiers are connected and arranged to be nonconductive during periods that the voltage developed by any bank of cells 32 decreases below that of the battery 53.

The antenna element 30 is used for both transmission and reception of radio signals. The transmitting and receiving frequencies are widely separated, for example by a 4:1 ratio. The receiving frequency band is in the lower portion of the ultra high frequency band and may be 544 to 550 megacycles per second, for example, and the transmitting frequency band is selected for minimum receiver noise and is in the upper portion of the ultra high frequency band and may be 2376 to 2424 megacycles per second. This frequency separation permits the use of the antenna element 30 for both reception and transmission.

Signals in the receiving frequency band intercepted by the antenna element 30 excite the entire antenna element 30 as a ground plane antenna, the satellite 20 serving as a ground plane. The received signals are applied to an input terminal 60 of the radio relay 50 (FIG. 5) via the second coaxial cable 27. The input terminal 60 is connected to a first input of a frequency converter or mixer circuit 61 which may be, if desired, a balanced crystal mixer circuit such as that shown on page 258 of vol. 16 of the M.I.T. Radiation Laboratory Series entitled "Microwave Mixers," published by McGraw-Hill Book Company, Inc. The input of the mixer circuit 61 includes a tuned circuit that passes signals in the receiving frequency band and rejects signals in the transmitting frequency band. The tuned circuit may be a tapped section of a resonant transmission line such as that shown on page 485 of "Radio Engineers' Handbook," by F. E. Terman, first edition, published by McGraw-Hill Book Company, Inc. A stable master oscillator 62 develops a base frequency wave at a frequency well below the receiving frequency band and which may be 50 megacycles per second. The master oscillator 62 may be a crystal oscillator circuit, such as one of those shown on page 496 of "Radio Engineers' Handbook," by F. E. Terman, first edition, published by McGraw-Hill Book Company, Inc., or a transistorized version thereof.

The output of the master oscillator 62 is connected to the input of a first frequency multiplier 63 which may comprise several stages of harmonic generators, such as those shown on page 459 of "Radio Engineers' Handbook," referenced above, or a transistorized version thereof, for example, to provide a frequency multiplication factor of 12. If desired, frequency multiplication may be accomplished in a circuit utilizing semiconductor diodes having a capacitance which varies with the applied voltage. Thus, when the master oscillator operates at 50 megacycles per second, a wave at 600 megacycles per second appears at the output of the first frequency multiplier 63 and is applied to a second input of the mixer circuit 61.

The output of the mixer circuit 61 is connected to the input of a selective, fixed tuned intermediate frequency amplifier 75, which may be of the type shown on page 397 of "Television Engineering," by Donald G. Fink, second edition, published by McGraw-Hill Book Company, Inc., or may be a transistorized version thereof. The intermediate frequency amplifier 75 has a frequency passband only sufficiently wide to provide amplification of the signal and at the same time provide rejection of undesired signals and noise outside the intermediate frequency band and, in the present example, has a bandwidth of 50 to 56 megacycles per second.

The output of the intermediate frequency amplifier 75 is connected to the input of the radio control circuit 51 and to the input of an amplitude demodulator 76 which may be of the type shown on page 554 of "Radio Engineers' Handbook." The amplitude demodulator 76 may also be a synchronous demodulator of any well known type; that is, a demodulator having a locally generated carrier wave injected in phase with the received signal. The modulating signal input of a phase modulator 77 is also coupled to the output of the amplitude demodulator 76 and the carrier wave input of the phase modulator 77 is connected to the output of the master oscillator 62. The phase modulator 77 may be one of those shown on page 583 of Radio Engineers' Handbook or a transistorized version thereof, or may utilize the variation in capacitance of a reverse biased semiconductor with applied voltage to vary the phase shift through a network.

The output of the phase modulator 77 is connected to the input of a second frequency multiplier 78, which may include several harmonic generators of the type utilized in the first frequency multiplier 63, to obtain a frequency multiplication factor of 48. A power amplifier 80, which may be of a traveling wave tube type, has its input coupled to the output of the second frequency multiplier 78 and its output connected to an output terminal 81. The output terminal 81 is connected by the first coaxial cable 29 to the interior of the antenna element 30.

Figures 5, 6:
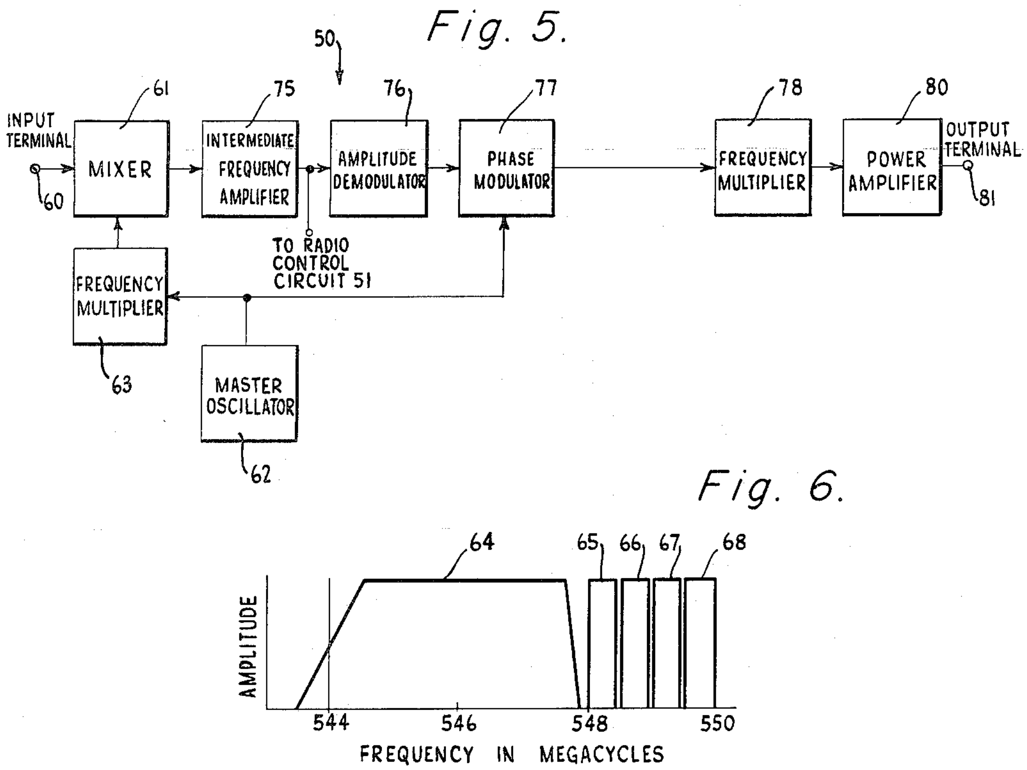
FIG. 5 is a diagram of an embodiment of a radio relay in accordance with the invention.
FIG. 6 is a diagram of the frequency spectrum of a signal received by the radio relay of FIG. 5.

The signal received by the radio relay 50 is a single sideband, suppressed carrier, amplitude modulated wave occupying a frequency band from 544 to 550 megacycles per second. The received signal includes a plurality of communication channels and its composition is illustrated in FIG. 6 is graphical form, the abscissa being the frequency in megacycles per second and the ordinate being the signal amplitude. A vestigial sideband television signal indicated at 64 in FIG. 6 occupies a frequency band extending from slightly below the carrier frequency of 544 megacycles per second to 548 megacycles per second. The television signal 64 is followed by four multpilex single sideband suppressed carrier telephone channels 65–68, each occupying a frequency band of substantially one-half megacycle per second, the four telephone channels 65–68 extending from 548 to 550 megacycles per second. Each of the telephone channels 65–68 conveys a plurality of multiplexed telephone messages, for example 100 messages per each of the channels 65–68.

Figure 7:
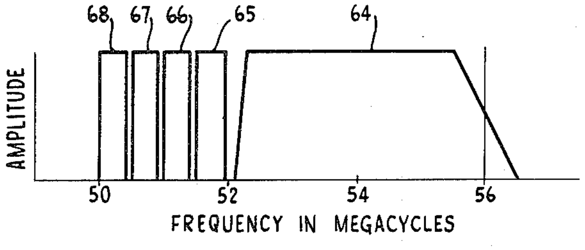
FIG. 7 is a diagram of the frequency spectrum of the intermediate frequency signal in the radio relay of FIG. 5.

The amplitude modulated signal is intercepted by the antenna element 30 and applied to the input terminal 60 of the radio relay 50 (FIG. 5). The received signal is applied to the input of the mixer 61 where it is heterodyned with the 600 megacycle wave to develop an intermediate frequency signal. The intermediate frequency is the difference frequency between the received signal and the 600 megacycle per second heterodyne wave, or 50 to 60 megacycles per second. FIG. 7 indicates the spectrum of the intermediate frequency signal at the output of the mixer 61. FIG. 7 is also a graph, the abscissa again being the frequency in megacycles per second and, similarly, the ordinate corresponds to the signal amplitude. As will be seen in FIG. 7, the intermediate frequency signal is inverted, that is, the television signal 64 which was received at the low end of the frequency band at 544 megacycles per second, is at the high frequency end of the intermediate frequency band, or 56 megacycles per second.

The intermediate frequency signal is coupled to the input of the intermediate frequency amplifier 75 and after amplification is applied to the input of the radio control circuit 51 and to the input of the amplitude demodulator 76. The modulating wave is demodulated or recovered from the intermediate frequency signal and is coupled to one input of the phase modulator 77. The 50 megacycle per second base frequency wave from the master oscillator 62 is phase modulated by the modulating wave in the phase modulator 77. The modulation is performed at a low modulation index, that is, with a low ratio of deviation of the frequency of the modulated wave away from the mean carrier wave frequency to the frequency of the modulating wave. The phase modulator 77 is adjusted so that a modulating wave of 6 megacycles per second will produce a modulation index of $\frac{1}{12}$ by selection of amplitude levels. Therefore, the phase modulated signal deviates no more than $\frac{1}{12}$ megacycle per second on each side of the carrier frequency. That is, the phase modulated signal occupies a band from 49.5 to 50.5 megacycles per second. By modulating at a moderate frequency and keeping the modulation index small, linearity of the signal is attained.

The phase modulated signal is applied to the second frequency multiplier 78 where it is multiplied by a factor of 48. This increases the modulation index to 4 and provides a phase modulated signal which deviates no more than 24 megacycles per second on each side of a carrier wave frequency of 2400 megacycles per second. Thus, the phase modulated signal now occupies a frequency band from 2376 to 2424 megacycles which results in a high signal-to-noise ratio.

The wideband, phase-modulated signal is coupled to the power amplifier 80 which increases the power to 2½ watts. The amplified signal is applied to the output terminal 81 and from thence to the antenna element 30, where it is radiated.

Figures 8, 9, 10:
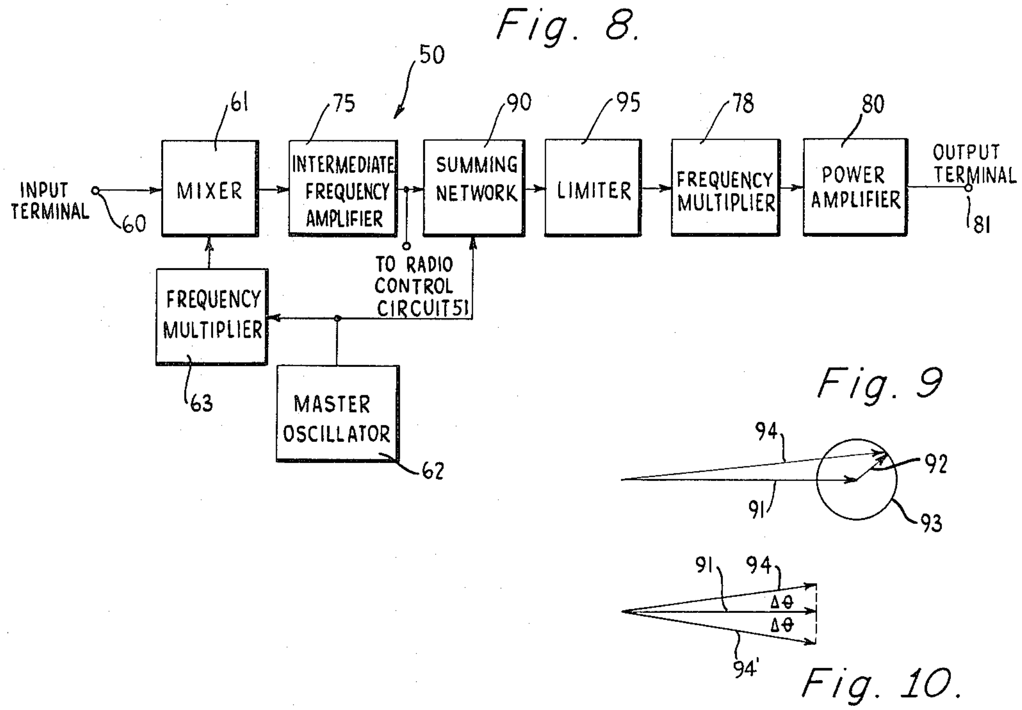
FIG. 8 is a diagram of a second embodiment of a radio relay in accordance with the invention.
FIG. 9 is a vector diagram indicating signal relationships in the summing network of FIG. 8.
FIG. 10 is a vector diagram indicating signal relationships in the limiter of FIG. 8.

In FIG. 8, a second embodiment of a radio relay 50 is shown. The second embodiment of the radio relay 50 is identical to the first embodiment shown in FIG. 5 except that the amplitude demodulator 76 and the phase modulator 77 are replaced by a summing network 90 and a limiter 95. That is, the output of the intermediate frequency amplifier 75 is connected to a first input of a summing network 90 which may be a resistive network, for example. A second input of the summing network 90 is connected to the output of the master oscillator 62. The intermediate frequency amplifier 75 may be provided with automatic gain control circuitry of any well known type to maintain the amplitude of the intermediate frequency signal substantially constant. Such automatic gain control circuitry, as is well known, has a sufficiently long time constant to suppress slow fluctuations such as fading without being responsive to instantaneous changes due to modulation.

The summing network is connected and arranged to combine the intermediate frequency signal with the base frequency wave from the master oscillator 62 with a 12:1 amplitude ratio. That is, the amplitude of the base frequency wave is 12 times larger than the amplitude of the intermediate frequency signal. The output of the summing network is connected to the input of the limiter 95, which may be of the type shown on page 1149 of "Radiotron Designers' Handbook," fourth edition, distributed by Radio Corporation of America, or a transistorized version thereof. The output of the limiter 95 is connected to the input of the second frequency multiplier 78. In other respects the embodiment of FIG. 8 is identical to that of FIG. 5.

The received amplitude modulated signal is applied to the input terminal 60 where it is coupled to the input of the mixer 61 and is heterodyned with the 600 megacycle per second wave derived by frequency multiplication from the 50 megacycle per second base frequency wave developed by the master oscillator 62. The resultant intermediate frequency signal is amplified in the intermediate frequency amplifier 75 and applied to the summing network 90 where it is combined with the 50 megacycle per second base frequency wave developed by the master oscillator 62.

FIG. 9 is a vector diagram indicating the relationship of the signals in the summing network 90. The arrow labeled "91" represents the 50 megacycle base frequency wave vector, while the arrow 92 indicates the intermediate frequency signal vector. The circle 93 represents the path traced by the point of the intermediate signal vector arrow 92 as it rotates with respect to the base frequency wave vector arrow 91. The output signal of the summing network 90 is a composite signal that is the vector sum of the intermediate frequency signal and the base frequency wave. The output signal is represented by the resultant vector arrow 94. It will be noted that as the intermediate frequency signal vector arrow 92 rotates around the circle 93, the resultant vector arrow 94 varies in length and swings above and below the base frequency wave vector arrow 91. Thus, the composite output signal from the summing network 90 is both amplitude modulated and phase modulated.

The combined signal is applied to the input terminals of the limiter 95 which limits the amplitude of the composite signal so that at the output thereof only the phase varies and not the amplitude. This is indicated in FIG. 10 where it may be seen that the composite signal varies from the base frequency signal by an angle $\Delta\theta$ in each direction, giving a total angular displacement of $2\Delta\theta$. Thus, phase modulation is produced having a modulation index of $\frac{1}{12}$, and by virtue of the 12:1 amplitude ratio, the intermodulation products of the adjacent signal channels are maintained within acceptable limits. As before, the phase modulated signal is multiplied in frequency, power amplified, and applied to the output terminal 81, where it is conducted to the antenna element 30 to be radiated. Thus, the transmitted signal has the high modulation inder required for noise reduction, and the raido relay 50 requires no detector or modulator, resulting in simplicity.

It should be noted that in the embodiment of FIG. 8, it is important that the frequency of the master oscillator 62 be at the low end of the intermediate frequency band. If the frequency of the master oscillator 62 is separated from the intermediate frequency band by an appreciable amount, the bandwidth of the phase modulated signal will be unnecessarily wide. If the frequency of the master oscillator 62 is within the intermediate frequency band, the phase modulated signal will be distorted. In the embodiment of FIG. 5, the frequency of the master oscillator 62 may be any frequency desired because of the amplitude demodulation of the intermediate frequency signal.

Figure 11:
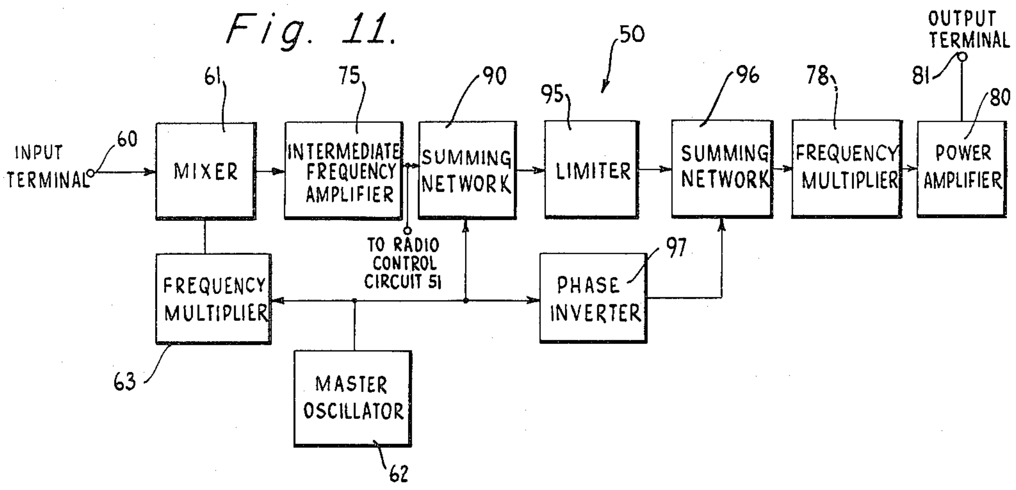
FIG. 11 is a diagram of a third embodiment of a radio relay in accordance with the invention.

A third embodiment of the radio relay 50, shown in FIG. 11, is identical with the embodiment of FIG. 8 except for the addition of a second summing network 96 and a phase inverter 97. That is, the output of the limiter 95 is connected to one input of the second summing network 96. The output of the master oscillator 62 is connected to the input of the phase inverter 97. The output of the phase inverter 97 is connected to the other input of the summing network 96. The output of the summing network 96 is connected to the input of the second frequency multiplier 78. The parameters of the first summing network 90 are modified to change the combining ratio from 10 to 1 to 100 to 1. That is, the base frequency wave has an amplitude 100 times greater than the amplitude of the intermediate frequency signal. The phase inverter 97 shifts the phase of the base frequency wave by 180 degrees so that a portion of the base frequency wave will be subtracted in the second summing network 96. The parameters of the second summing network 96 are such that the phase modulated signal at the output thereof has a modulation index of $\frac{1}{12}$.

The received signal is heterodyned with the 600 megacycle per second wave in the mixer 61 to produce an intermediate frequency signal. The intermediate frequency amplifier 75 amplifies the signal and applies it to the first summing network 90 where a composite wave is developed. The composite wave is amplitude limited by the limiter 95 to produce a phase modulated wave. The phase modulated wave is applied to the second summing network 96, the base frequency wave also being applied to the summing network 96 through the phase inverter 97. In this manner, the amplitude of the base frequency wave portion of the phase modulated signal is reduced to provide a modulation index of $\frac{1}{12}$. The phase modulated signal is then multiplied in frequency, amplified in power, and radiated as before. In this manner, phase modulation is accomplished with greater linearity and less intermodulation than in the embodiment of the radio relay 50 of FIG. 8.

Figure 12:
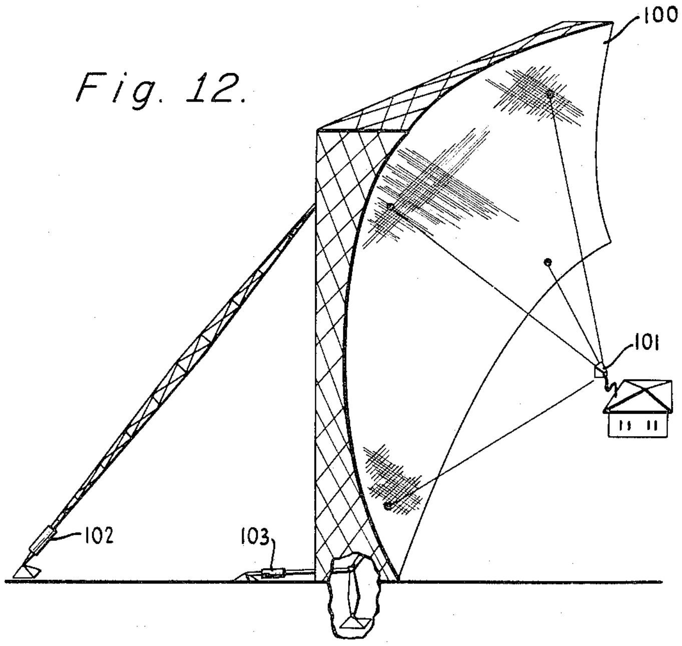
FIG. 12 is a pictorial view of a ground station receiving antenna.

In FIG. 12 there is shown an antenna which is used at the ground stations 22 and 25. It is used both for transmission and reception and provides a high gain, on the order of 58 decibels, for example. The antenna includes a reflector 100 having the shape of a truncated, off-center paraboloid whose projection onto a plane is a 150 foot square, thus a large antenna aperture is provided. Antenna feed horns 101 are disposed in front of the reflector 100 and are coaxial, thus taking advantage of the 4:1 frequency separation between the transmitted and received signals. The antenna feed horns 101 are located close to the ground, a situation made possible by virtue of the reflector 100 being an off-center portion of a paraboloid, as previously noted. The reflector 100 is movable and may be moved approximately plus or minus 5 degrees in azimuth and elevation by hydraulic jacks 102 and 103 to maintain the beam from the reflector 100 directed to the satellite 20.

Figure 13:
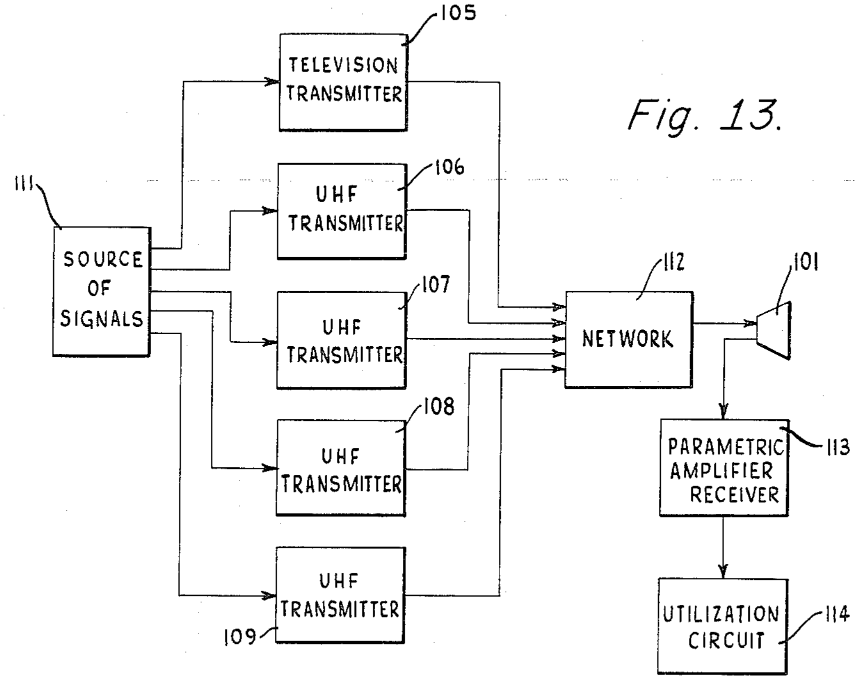
FIG. 13 is a diagram of ground station receiving and transmitting equipment.

Referring to FIG. 13, the ground stations 22 and 25 utilize 5 ultra high frequency transmitters 105–109. The television transmitter 105 may be, for example, a model TTU–25B transmitter, designed by the Radio Corporation of America. The telephone signal transmitters 106–109 may utilize the audio portion of similar ultra high frequency television transmitters that are suitably modified to accept the multiplexed telephone signals. A source of signals 111, which may be telephone lines, for example, is coupled to the inputs of the transmitters 105–109. The outputs of the transmitters 105–109 are combined in a network 112 and supplied to the antenna feed horns 101 where they are radiated onto the reflector 100 and reflected to the satellite 20. For receiving, a low-noise receiver 113 such as one utilizing a liquid nitrogen cooled parametric radio frequency amplifier is provided. The parametric radio frequency amplifier may be similar to that described in the Proceedings of the I.R.E., vol. 47, No. 12, December 1959, at pages 2113, 2114, by M. Uenohara and A. E. Bakanowski. Alternatively, the receiver 113 may utilize a maser amplifier similar to that described in the Proceedings of the I.R.E., vol. 47, No. 6, June 1959, at pages 1062–1069, by J. A. Giordmaine, L. E. Alsop, C. H. Mayer and C. H. Townes. The received signals are supplied to a utilization circuit 114, which may be telephone lines, for example.

In the embodiments of a radio relay 50 described herein, it will be understood that either phase or frequency modulation may be used and that differentiating or integrating networks may be utilized as desired to adapt the modulators or demodulators for frequency or phase modulation. The significant point to be noted is that the radio relay 50 of the present invention retransmits received intelligence as angle modulation of a carrier wave, and that whether this is frequency or phase modulation is of little consequence. Angle modulation is modulation in which the angle of a sine wave carrier is the characteristic varied from its normal value, phase and frequency modulation being particular forms of angle modulation. By "angle" is meant the phase or measure of the progression of a wave in time or space from a chosen instant or position; and in the mathematical expression for a sine wave, the angle or phase is the value of the entire argument or independent variable of the sine function. In the representation of a sine wave by a rotating vector, the angle or phase is the angle through which the vector has progressed.

As is well known, phase modulation is closely related to frequency modulation. "Phase modulation" may be defined as angle modulation in which the angle of a sine wave carrier is caused to depart from the carrier angle by an amount proportional to the instantaneous value of the modulating wave. "Frequency modulation," on the other hand, may be defined as angle modulation of a sine wave carrier in which the instantaneous frequency of the modulated wave differs from the carrier frequency by an amount proportional to the instantaneous value of the modulating wave. Combinations of phase and frequency modulation are commonly referred to as "frequency modulation."

The essential difference between phase and frequency modulation is that in the former, the modulation index is independent of modulating frequency while, in the latter, it is inversely proportional to the modulating frequency. With a modulating wave of constant amplitude the width of the frequency band required to accommodate a phase modulated wave is proportional to the frequency of the modulating wave, while with frequency modulation, the frequency band occupied is independent of the frequency of the modulating wave, except when the modulation index is small.

By use of suitable networks, angle modulation and demodulation circuits may be used for either phase or frequency modulated waves. A differentiating circuit is one whose output waveform is the time derivative of its input waveform. That is, the ratio of output amplitude to input amplitude of a differentiating circuit is proportional to frequency and the output phase leads the input phase by 90°. A differentiating circuit may be used to precede a frequency modulator to make the combination a phase modulation modulator or may follow a phase modulation detector to make the combination a frequency modulation detector. An integrating circuit, on the other hand, is a circuit whose output waveform is the time integral of its input waveform. The ratio of output amplitude to input amplitude of an integrator is inversely proportional to frequency and the output phase lags the input phase by 90°. Such a network preceding a phase modulator makes the combination a frequency modulator or, following a frequency modulation detector makes the combination a phase modulation detector.

Thus, there has been described, a radio communication relay system which is simple in form, reliable in operation, small in size, light in weight, and low in power consumption. The radio communication relay simultaneously receives and retransmits a plurality of signals with a minimum of intermodulation and with a high signal-to-noise ratio.

While several embodiments of the invention have been shown and described, modifications may be made, and it is intended in the appended claims to cover all such modifications as may fall within the true spirit and scope of the invention.

What is claimed is:

1. A radio communication system comprising: means for transmitting electrical information as single sideband amplitude modulation of a wave at a first frequency in the ultra high frequency band; means for receiving said amplitude modulated wave; a source of a carrier wave having an amplitude one hundred times greater than the amplitude of said amplitude modulated wave; means having its inputs individually coupled to the output of said receiving means and to the output of said source for additively combining said amplitude modulated wave with said carrier wave to develop a composite wave; means having its input coupled to the output of said combining means for limiting the amplitude of said composite wave to develop a phase modulated carrier wave having a low modulation index; means having its inputs coupled to the output of said limiting means and to the output of said source for additively combining said phase modulated carrier wave and said carrier wave in an out-of-phase relationship and with the amplitude of said carrier wave ten times greater than the amplitude of said phase modulated wave; means for multiplying the frequency of said phase modulated carrier wave to a second frequency at least four times higher than said first frequency to increase said modulation index; means having its input coupled to the output of said last named means for transmitting said phase modulated carrier wave; and means for receiving said phase modulated carrier wave and recovering said electrical information.

2. In a radio relay, a circuit comprising: a single antenna having two modes of operation, one of said modes being as a slotted coaxial radiator for transmitting signals at a transmitting frequency, and the other of said modes being as a ground plane antenna for intercepting signals at a receiving frequency widely separated from said transmitting frequency; a source of a carrier wave having a large amplitude compared to said intercepted signals; a first summing network coupled to said antenna and to said source for combining said intercepted signals with said carrier wave to develop a phase and amplitude modulated carrier wave having a low modulation index; an amplitude limiter coupled to said first summing network for limiting the amplitude of said modulated wave; a frequency multiplier coupled to said limiter for multiplying the frequency of said modulated wave to said transmitting frequency; and a transmitter coupled between said frequency multiplier and said antenna for radiation of said modulated wave.

3. In a radio relay, a circuit comprising: a single antenna having two modes of operation, one of said modes being as a slotted coaxial radiator for transmitting signals at a transmitting frequency, and the other of said modes being as a ground plane antenna for intercepting signals at a receiving frequency widely separated from said transmitting frequency; a source of a carrier wave having a large amplitude compared to said intercepted signals; a first summing network coupled to said antenna and to said source for combining said intercepted signals with said carrier wave to develop a phase and amplitude modulated carrier wave having a low modulation index; an amplitude limiter coupled to said first summing network for limiting the amplitude of said modulated wave; a phase inverter coupled to said source for providing a canceling wave out of phase with and having an amplitude less than the carrier wave component of said modulated wave, a second summing network coupled to said phase inverter and to said limiter for combining said canceling wave with said modulated wave to provide a resultant phase modulated wave having a larger modulation index and low distortion; a frequency multiplier coupled to said second summing network for multiplying the frequency of said resultant wave to said transmitting frequency; and a transmitter coupled between said frequency multiplier and said antenna for radiation of said resultant wave.

References Cited in the file of this patent

UNITED STATES PATENTS

| | | |
|---|---|---|
| 2,287,044 | Kroger | June 23, 1942 |
| 2,378,581 | Roberts | June 19, 1945 |
| 2,514,425 | Thompson | July 11, 1950 |